US011665425B2

(12) United States Patent
Seethaler et al.

(10) Patent No.: US 11,665,425 B2
(45) Date of Patent: May 30, 2023

(54) APPARATUS, METHOD, AND PROGRAM PRODUCT FOR OPERATING A CAMERA SENSE MODE

(71) Applicant: LENOVO (Singapore) PTE. LTD., New Tech Park (SG)

(72) Inventors: Kenneth Seethaler, Raleigh, NC (US); Adam Jerome Cavenaugh, Cary, NC (US); Brian Lee, Raleigh, NC (US); Joseph M. Pennisi, Apex, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 147 days.

(21) Appl. No.: 17/115,623

(22) Filed: Dec. 8, 2020

(65) Prior Publication Data
US 2022/0182544 A1    Jun. 9, 2022

(51) Int. Cl.
*H04N 23/667* (2023.01)
*H04N 23/61* (2023.01)
*H04N 23/80* (2023.01)

(52) U.S. Cl.
CPC ........... *H04N 23/667* (2023.01); *H04N 23/61* (2023.01); *H04N 23/80* (2023.01)

(58) Field of Classification Search
CPC ........... H04B 5/23245; H04N 5/23218; H04N 5/23229; H04N 5/23245; H04N 1/00082; H04N 1/00915; H04N 1/00925; H04N 1/00777; H04N 1/00875; H04N 1/2376; H04N 1/000838; H04N 23/667; H04N 23/61; H04N 23/80; G06K 11/10; G06K 9/62

See application file for complete search history.

(56) References Cited

U.S. PATENT DOCUMENTS

| 5,604,562 | A  | * | 2/1997 | Aoyama  | G02B 7/28 |
| | | | | | 396/79 |
| 10,268,842 | B2 | * | 4/2019 | Lai | H04N 1/21 |
| 2006/0055825 | A1 | * | 3/2006 | Shiota | H04N 5/445 |
| | | | | | 348/563 |
| 2018/0239930 | A1 | * | 8/2018 | Lai | G06F 21/74 |
| 2019/0011805 | A1 | * | 1/2019 | Ota | G03B 13/36 |
| 2019/0132528 | A1 | * | 5/2019 | Nashizawa | H04N 5/232 |

\* cited by examiner

*Primary Examiner* — Marly S Camargo
(74) *Attorney, Agent, or Firm* — Kunzler Bean & Adamson

(57) ABSTRACT

Apparatuses, methods, and program products are disclosed for operating a camera sense mode. One apparatus includes a processor, a camera, and a memory that stores code executable by the processor. The code is executable by the processor to determine, by use of the processor, whether the camera is set to a camera sense mode. The camera sense mode is a mode of the camera configured to use the camera as a sensor. The code is executable by the processor to, in response to the camera being set to the camera sense mode: analyze images captured by the camera, using a sensing application, to determine information related to the images; and inhibit applications separate from the sensing application from accessing images captured by the camera.

20 Claims, 5 Drawing Sheets

APPARATUS, METHOD, AND PROGRAM PRODUCT FOR OPERATING A CAMERA SENSE MODE

FIELD

The subject matter disclosed herein relates to cameras and more particularly relates to operating a camera sense mode of a camera.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may include digital cameras. Images from digital cameras may be provided to one or more software applications.

BRIEF SUMMARY

An apparatus for operating a camera sense mode is disclosed. A method and computer program product also perform the functions of the apparatus. In one embodiment, the apparatus includes a processor, a camera, and a memory that stores code executable by the processor. The code, in various embodiments, is executable by the processor to determine, by use of the processor, whether the camera is set to a camera sense mode. The camera sense mode is a mode of the camera configured to use the camera as a sensor. The code, in certain embodiments, is executable by the processor to, in response to the camera being set to the camera sense mode: analyze images captured by the camera, using a sensing application, to determine information related to the images; and inhibit applications separate from the sensing application from accessing images captured by the camera.

In some embodiments, the camera includes a first setting that sets the camera to the camera sense mode and a second setting that sets the camera to a video capture mode, and the video capture mode enables applications separate from the sensing application to access images captured by the camera. In one embodiment, the camera includes a third setting that sets the camera to an off mode in which the camera does not capture data or images.

In various embodiments, the information related to the images includes information indicating a number of people in an image, information indicating an identity of a person in an image, information indicating an unidentified person in an image, information indicating a presence of a person in an image, or some combination thereof. In some embodiments, the sensing application uses the images captured by the camera at the apparatus, and the sensing application does not provide the images captured by the camera to a device separate from the apparatus.

A method for operating a camera sense mode, in one embodiment, includes determining, by use of a processor, whether a camera is set to a camera sense mode. The camera sense mode is a mode of the camera configured to use the camera as a sensor. In certain embodiments, the method includes, in response to the camera being set to the camera sense mode: analyzing images captured by the camera, using a sensing application, to determine information related to the images; and inhibiting applications separate from the sensing application from accessing images captured by the camera.

In some embodiments, the camera sense mode is set by hardware, software, or a combination thereof. In various embodiments, the hardware includes a manual switch, an electronic switch, or a combination thereof. In one embodiment, the camera sense mode is set by a user of the camera. In some embodiments, the camera sense mode is set by moving a mechanical switch. In certain embodiments, the camera sense mode is set by pressing a button or a key.

In some embodiments, the camera sense mode is set by selecting a software setting. In various embodiments, the camera includes a first setting that sets the camera to the camera sense mode and a second setting that sets the camera to a video capture mode, and the video capture mode enables applications separate from the sensing application to access images captured by the camera. In certain embodiments, the camera includes a third setting that sets the camera to an off mode in which the camera does not capture data or images. In some embodiments, the information related to the images includes information indicating a number of people in an image, information indicating an identity of a person in an image, information indicating an unidentified person in an image, information indicating a presence of a person in an image, or some combination thereof. In various embodiments, the sensing application uses the images captured by the camera at a first device including the camera. In certain embodiments, the sensing application does not provide the images captured by the camera to a second device separate from the first device.

In one embodiment, a program product includes a computer readable storage medium that stores code executable by a processor. The executable code, in certain embodiments, includes code to perform determining, by use of the processor, whether a camera is set to a camera sense mode. The camera sense mode is a mode of the camera configured to use the camera as a sensor. The executable code, in various embodiments, includes code to perform, in response to the camera being set to the camera sense mode: analyzing images captured by the camera, using a sensing application, to determine information related to the images; and inhibiting applications separate from the sensing application from accessing images captured by the camera.

In certain embodiments, the camera sense mode is manually set by a user of the camera via hardware, software, or a combination thereof. In one embodiment, the camera includes a first setting that sets the camera to the camera sense mode, a second setting that sets the camera to a video capture mode, a third setting that sets the camera to an off mode in which the camera does not capture data or images, and the video capture mode enables applications separate from the sensing application to access images captured by the camera.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
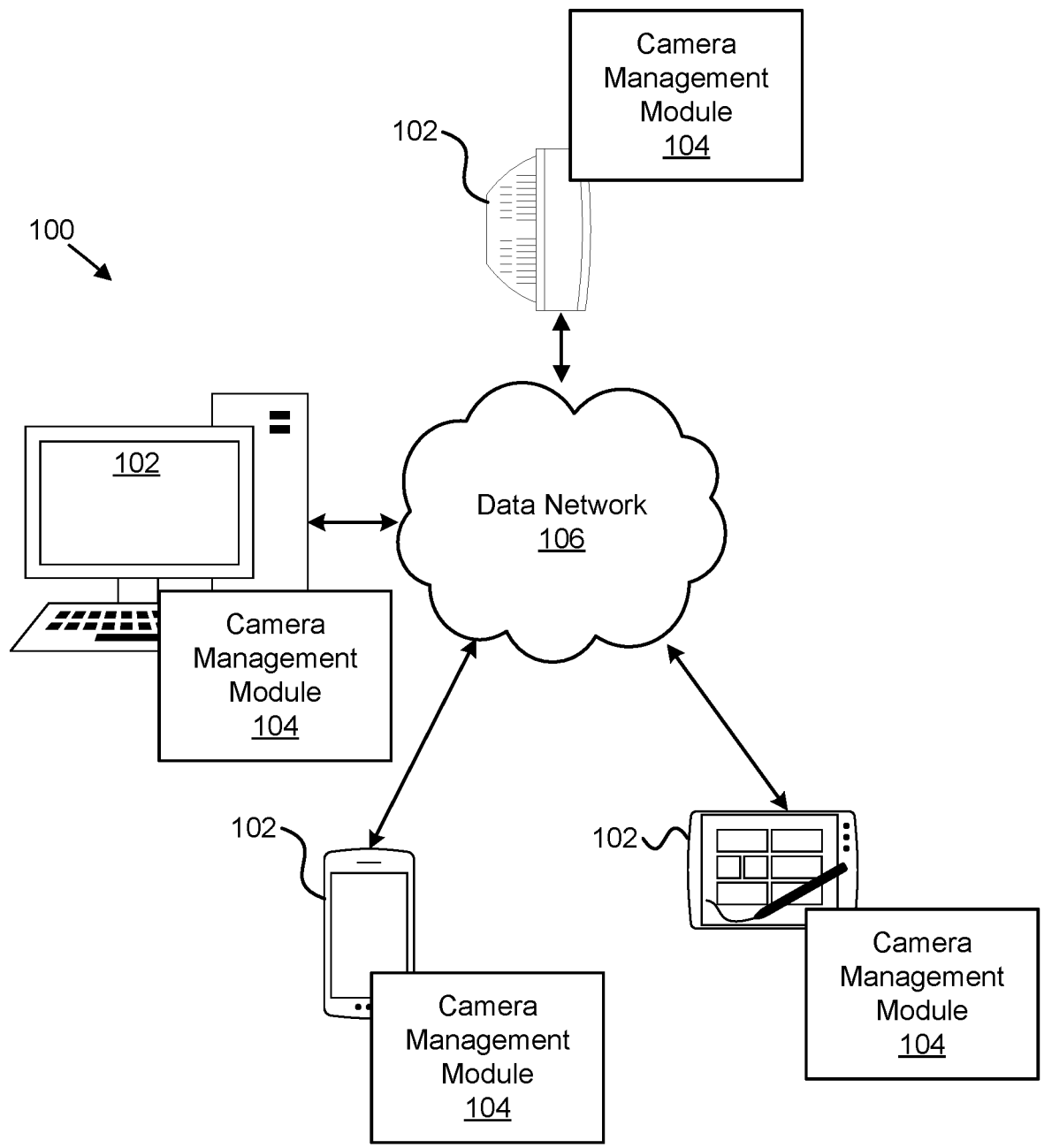
FIG. 1 is a schematic block diagram illustrating one embodiment of a system for operating a camera sense mode.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for operating a camera sense mode. In one embodiment, the system 100 includes information handling devices 102, camera management modules 104, and data networks 106. Even though a specific number of information handling devices 102, camera management modules 104, and data networks 106 are depicted in FIG. 1, one of skill in the art will recognize that any number of information handling devices 102, camera management modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, digital assistants (e.g., public digital assistants), or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the camera management module 104. In certain embodiments, the camera management module 104 may determine, by use of a processor, whether a camera is set to a camera sense mode. The camera sense mode is a mode of the camera configured to use the camera as a sensor. The camera management module 104 may also, in response to the camera being set to the camera sense mode: analyze images captured by the camera, using a sensing application, to determine information related to the images; and inhibit applications separate from the sensing application from accessing images captured by the camera. In this manner, the camera management module 104 may be used for operating a camera sense mode.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
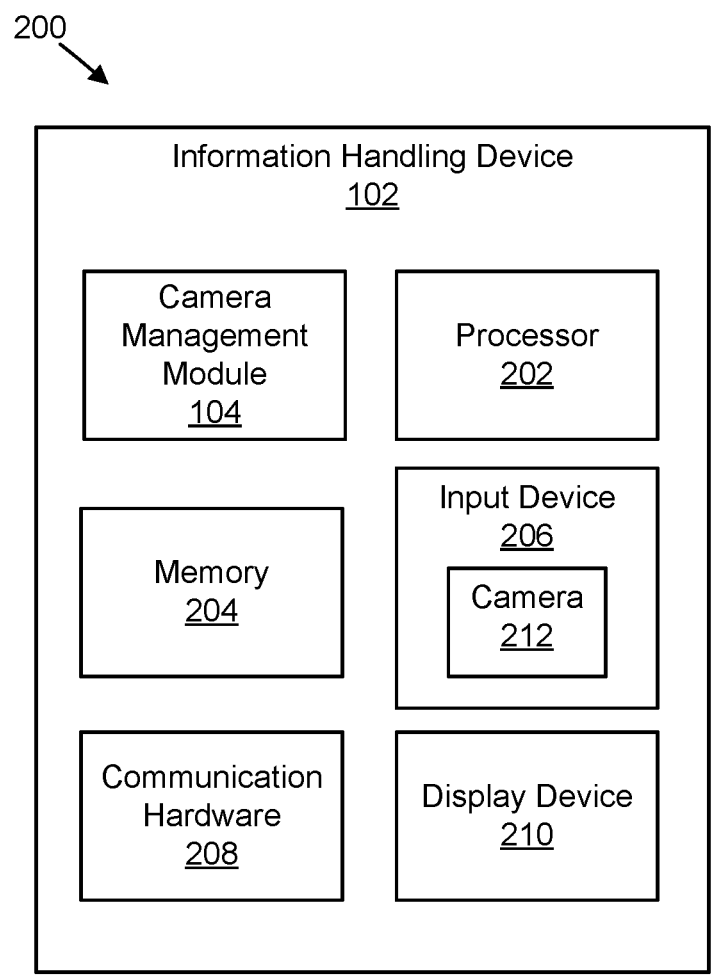
FIG. 2 is a schematic block diagram illustrating one embodiment of an apparatus including an information handling device.

FIG. 2 depicts one embodiment of an apparatus 200 that may be used for operating a camera sense mode. The apparatus 200 includes one embodiment of the information handling device 102. Furthermore, the information handling device 102 may include the camera management module 104, a processor 202, a memory 204, an input device 206, communication hardware 208, and optionally a display device 210. In some embodiments, the input device 206 and the display device 210 are combined into a single device, such as a touchscreen. Furthermore, the input device 206 includes a camera 212.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the camera management module 104, the input device 206, the communication hardware 208, the display device 210, and the camera 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores configuration information. In some embodiments, the memory 204 also stores program code and related data, such as an operating system, other controller algorithms operating on the information handling device 102, and/or one or more software applications.

The information handling device 102 may use the camera management module 104 for operating a camera sense mode. As may be appreciated, the camera management module 104 may include computer hardware, computer software, or a combination of both computer hardware and computer software. For example, the camera management module 104 may include circuitry, or the processor 202, used to determine, by use of the processor 202, whether the camera 212 is set to a camera sense mode. As another example, the camera management module 104 may include computer program code that, in response to the camera 212 being set to the camera sense mode: analyzes images captured by the camera 212, using a sensing application, to determine information related to the images; and inhibit applications separate from the sensing application from accessing images captured by the camera 212.

The input device 206, in one embodiment, may include any known computer input device including a touch panel, a button, a keyboard, a stylus, a microphone for receiving audio input (e.g., or another audio input device for receiving audio input), or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth. In the illustrated embodiment, the input device 206 includes the camera 212. The camera 212 may be any suitable type of camera used for capturing images.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the camera management module 104.

In some embodiments, a user may want to use the camera 212 in a camera sense mode that does not allow images from the camera 212 to be stored, be made available on a network (e.g., the Internet), and/or be accessible to one or more software applications. Described herein are various embodiments that use a camera management module 104 to operate in the camera sense mode.

Figure 3:
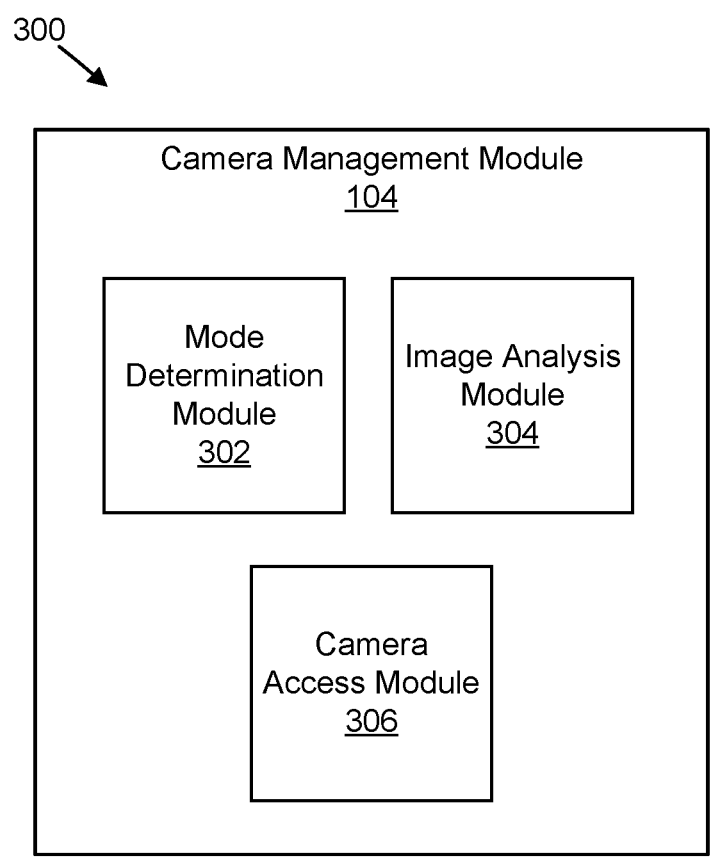
FIG. 3 is a schematic block diagram illustrating one embodiment of an apparatus including a camera management module.

FIG. 3 depicts a schematic block diagram illustrating one embodiment of an apparatus 300 (e.g., information handling device 102) that includes one embodiment of the camera management module 104. Furthermore, the camera management module 104 includes a mode determination module 302, an image analysis module 304, and a camera access module 306.

In certain embodiments, the mode determination module 302 may determine, by use of a processor (e.g., the processor 202), whether a camera (e.g., the camera 212) is set to a camera sense mode. In various embodiments, the camera sense mode is a mode of the camera configured to use the camera as a sensor. In certain embodiments, using the camera as a sensor may mean using the camera to sense light, a color, a particular person, a known person, an unknown person, a number of people, an object, an image, a background, a foreground, a location, clothing worn by a person, and so forth. By using the camera as a sensor (e.g., computer vision), artificial intelligence local to the information handling device 102 containing the camera may perform various functions based on what the camera senses. The artificial intelligence may operate solely with local computer processing. In certain embodiments, the camera operating as a sensor operates in a low resolution and/or low power mode.

In some embodiments, the camera sense mode is set by hardware, software, or a combination thereof. In various embodiments, the hardware includes a manual switch, an electronic switch, or a combination thereof. For example, hardware of an information handling device 102 may have a physical slider (e.g., mechanical slider, hardware slider, mechanical switch) to enable selection of the camera sense mode. The physical slider may have three distinct positions (e.g., camera shutter positions). A first position that turns the camera off so that the camera does not operate (e.g., does not capture any information and/or images). A second position may indicate that the camera is in the camera sense mode as described herein. A third position may indicate that the camera is used in a full camera mode (e.g., traditional camera mode, standard camera mode, video capture mode, all camera modes supported) in which all software applications have access to the camera and/or the camera is used to capture still pictures and/or video. The physical slider may be used to set global use of the camera so that the camera may only be used according to the position of the physical slider (e.g., there is no software override of the physical slider). The physical slider may switch between the first, second, and third positions by physically moving the physical slider between the different positions.

In certain embodiments, a switch (e.g., physical slider, mechanical switch, button, key) may only turn on and off the camera sense mode. In such embodiments, the camera may only be used in the camera sense mode if the switch is on, and the camera may only be in a fully on (e.g., video capture mode) or off mode if the switch is off. In various embodiments, an electrical signal and/or electrical switch may be used to turn on and off the camera sense mode.

In one embodiment, the camera sense mode is set by a user of the camera. The user may set the camera sense mode using a physical slider, a switch, a button, a key, and/or a software setting. The software setting may be a global software setting that sets global use (e.g., use by all software applications including the operating system) of the camera to the camera sense mode. In some embodiments, the camera may only be used in the camera sense mode if the software setting is set so that the camera sense mode is turned on, and the camera may only be in a fully on (e.g., video capture mode) or off mode if the software setting is set so that the camera sense mode is turned off. In certain embodiments, the video capture mode enables applications separate from a sensing application to access images captured by the camera, and the camera sense mode enables only the sensing application to access images captured by the camera. In certain embodiments, the off mode is a mode in which the camera does not capture data and/or images.

In one embodiment, the image analysis module 304 may, in response to the camera being set to the camera sense mode, analyze images captured by the camera (e.g., using a sensing application) to determine information related to the images. In some embodiments, the information related to the images includes information indicating one or more of the following about an image: a number of people, an identity of a person, an unidentified person, a presence of a person, a particular person, a known person, an unknown person, an amount of light, a color, an object, an image, a background, a foreground, a location, and/or clothing worn by a person.

In various embodiments, the sensing application uses the images captured by the camera at a first device including the camera (e.g., only at the first device, without the images being transferred from the first device). In certain embodiments, the sensing application does not provide the images captured by the camera to a second device separate from the first device. Accordingly, in the camera sense mode, security and/or privacy in relation to the camera is enhanced. For example, hackers may be blocked by the camera sense mode from accessing the camera and obtaining images from the camera. As another example, web-based applications may be blocked by the camera sense mode from accessing the camera and obtaining images from the camera. As a further example, in the camera sense mode video is not able to be captured to show locally on the information handling device 102 containing the camera and video is not able to be captured to broadcast and/or stream from the information handling device 102 containing the camera.

In various embodiments, the camera access module 306 may, in response to the camera being set to the camera sense mode, inhibit applications separate from the sensing application from accessing images captured by the camera. In some embodiments, the sensing application is a software application dedicated to only using the camera in the camera sense mode. The sensing application has artificial intelligence built into it to facilitate using the camera as a sensor for "computer vision" and not for standard video capture.

Figure 4:
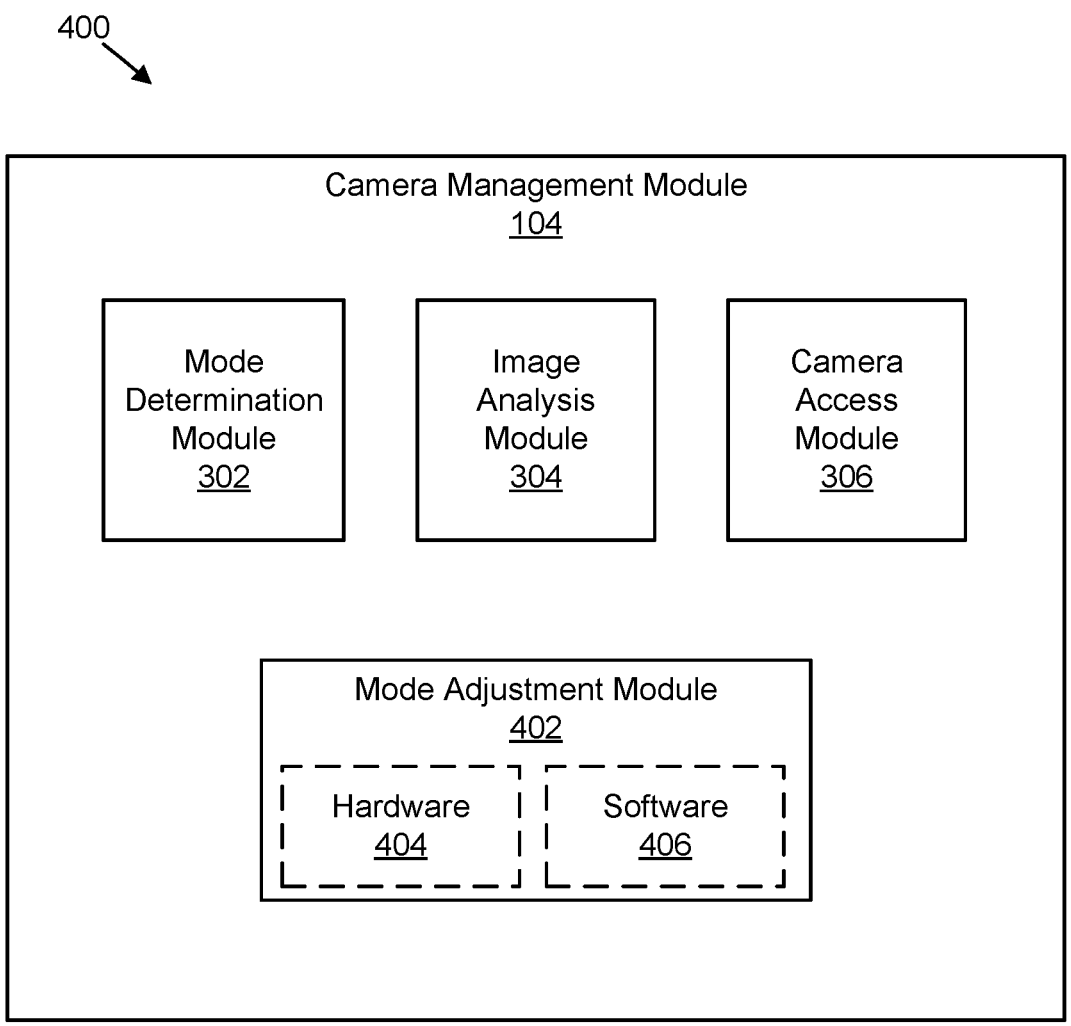
FIG. 4 is a schematic block diagram illustrating another embodiment of an apparatus including a camera management module.

FIG. 4 is a schematic block diagram illustrating another embodiment of an apparatus 400 that includes one embodiment of the camera management module 104. Furthermore, the camera management module 104 includes one embodiment of the mode determination module 302, the image analysis module 304, and the camera access module 306, that may be substantially similar to the mode determination module 302, the image analysis module 304, and the camera access module 306 described in relation to FIG. 3. The camera management module 104 also includes a mode adjustment module 402.

The mode adjustment module 402 may include hardware 404 and/or software 406. The hardware 404 may include a physical slider, a physical switch, a shutter position, a key, a button, and so forth. The software 406 may include a global software setting, a hardware directed software setting, and so forth.

Figure 5:
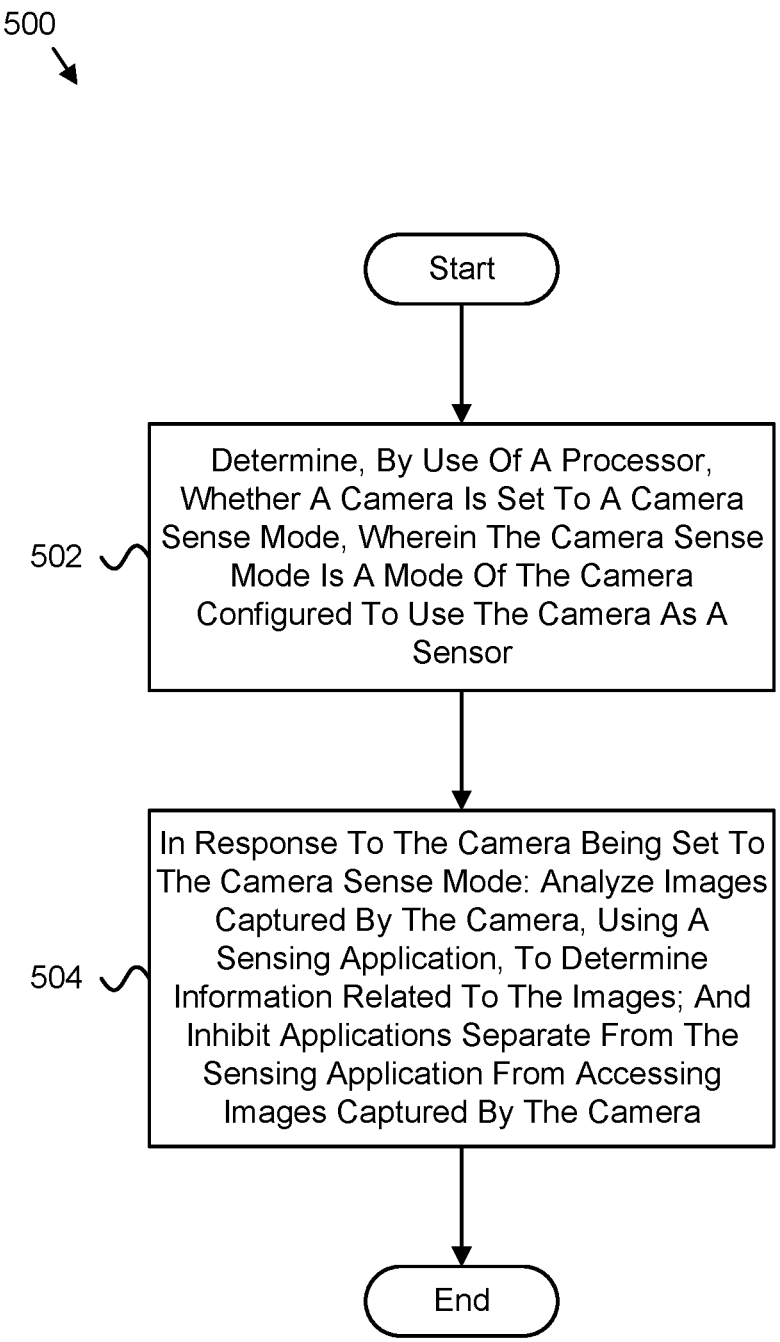
FIG. 5 is a schematic flow chart diagram illustrating an embodiment of a method for operating a camera sense mode.

FIG. 5 is a schematic flow chart diagram illustrating an embodiment of a method 500 for operating a camera sense mode. In some embodiments, the method 500 is performed by an apparatus, such as the information handling device 102. In other embodiments, the method 500 may be performed by a module, such as the camera management module 104. In certain embodiments, the method 500 may be performed by a processor executing program code, for example, a microcontroller, a microprocessor, a CPU, a GPU, an auxiliary processing unit, a FPGA, or the like.

The method 500 may include determining 502, by use of a processor (e.g., the processor 202), whether a camera (e.g., the camera 212) is set to a camera sense mode. In certain embodiments, the mode determination module 302 may determine 502 whether the camera is set to the camera sense mode. In various embodiments, the camera sense mode is a mode of the camera configured to use the camera as a sensor.

The method 500 may include, in response to the camera being set to the camera sense mode: analyzing 502 images captured by the camera, using a sensing application, to determine information related to the images; and inhibiting applications separate from the sensing application from accessing images captured by the camera. In some embodiments, the image analysis module 304 may analyze 502 images captured by the camera, using the sensing application, to determine information related to the images. In various embodiments, the camera access module 306 may inhibit applications separate from the sensing application from accessing images captured by the camera.

In some embodiments, the camera sense mode is set by hardware, software, or a combination thereof. In various embodiments, the hardware includes a manual switch, an electronic switch, or a combination thereof. In one embodiment, the camera sense mode is set by a user of the camera. In some embodiments, the camera sense mode is set by moving a mechanical switch. In certain embodiments, the camera sense mode is set by pressing a button or a key.

In some embodiments, the camera sense mode is set by selecting a software setting. In various embodiments, the camera includes a first setting that sets the camera to the camera sense mode and a second setting that sets the camera to a video capture mode, and the video capture mode enables applications separate from the sensing application to access images captured by the camera. In certain embodiments, the camera includes a third setting that sets the camera to an off mode in which the camera does not capture data or images. In some embodiments, the information related to the images includes information indicating a number of people in an image, information indicating an identity of a person in an image, information indicating an unidentified person in an image, information indicating a presence of a person in an image, or some combination thereof. In various embodiments, the sensing application uses the images captured by the camera at a first device including the camera. In certain embodiments, the sensing application does not provide the images captured by the camera to a second device separate from the first device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a camera; and
   a memory that stores code executable by the processor to:
      determine, by use of the processor, whether the camera is settable to a camera sense mode and a video capture mode, wherein the camera sense mode is a mode of the camera configured to use the camera as a sensor, wherein the video capture mode is a mode of the camera configured to capture still pictures or video images; and
      in response to the camera being set to the camera sense mode:
         analyze images captured by the camera, using a sensing application, to determine information related to the images; and
         inhibit applications separate from the sensing application from accessing images captured by the camera.

2. The apparatus of claim 1, wherein the camera comprises a first setting that sets the camera to the camera sense mode and a second setting that sets the camera to a video capture mode, and the video capture mode enables applications separate from the sensing application to access images captured by the camera.

3. The apparatus of claim 2, wherein the camera comprises a third setting that sets the camera to an off mode in which the camera does not capture data or images.

4. The apparatus of claim 1, wherein the information related to the images comprises information indicating a number of people in an image, information indicating an identity of a person in an image, information indicating an unidentified person in an image, information indicating a presence of a person in an image, or some combination thereof.

5. The apparatus of claim 1, wherein the sensing application uses the images captured by the camera at the apparatus, and the sensing application does not provide the images captured by the camera to a device separate from the apparatus.

6. A method comprising:
   determining, by use of a processor, whether a camera is settable to a camera sense mode and a video capture mode, wherein the camera sense mode is a mode of the camera configured to use the camera as a sensor, wherein the video capture mode is a mode of the camera configured to capture still pictures or video images; and
   in response to the camera being set to the camera sense mode:
      analyzing images captured by the camera, using a sensing application, to determine information related to the images; and
      inhibiting applications separate from the sensing application from accessing images captured by the camera.

7. The method of claim 6, wherein the camera sense mode is set by hardware, software, or a combination thereof.

8. The method of claim 7, wherein the hardware comprises a manual switch, an electronic switch, or a combination thereof.

9. The method of claim 6, wherein the camera sense mode is set by a user of the camera.

10. The method of claim 6, wherein the camera sense mode is set by moving a mechanical switch.

11. The method of claim 6, wherein the camera sense mode is set by pressing a button or a key.

12. The method of claim 6, wherein the camera sense mode is set by selecting a software setting.

13. The method of claim 6, wherein the camera comprises a first setting that sets the camera to the camera sense mode and a second setting that sets the camera to a video capture mode, and the video capture mode enables applications separate from the sensing application to access images captured by the camera.

14. The method of claim 13, wherein the camera comprises a third setting that sets the camera to an off mode in which the camera does not capture data or images.

15. The method of claim 6, wherein the information related to the images comprises information indicating a number of people in an image, information indicating an identity of a person in an image, information indicating an unidentified person in an image, information indicating a presence of a person in an image, or some combination thereof.

16. The method of claim 6, wherein the sensing application uses the images captured by the camera at a first device comprising the camera.

17. The method of claim 16, wherein the sensing application does not provide the images captured by the camera to a second device separate from the first device.

18. A program product comprising a non-transitory computer readable storage medium that stores code when executed by a processor causes the processor to perform the steps of:

determining, by use of the processor, whether a camera is settable to a camera sense mode and a video capture mode, wherein the camera sense mode is a mode of the camera configured to use the camera as a sensor, wherein the video capture mode is a mode of the camera configured to capture still pictures or video images; and in response to the camera being set to the camera sense mode:
- analyzing images captured by the camera, using a sensing application, to determine information related to the images; and
- inhibiting applications separate from the sensing application from accessing images captured by the camera.

19. The program product of claim 18, wherein the camera sense mode is manually set by a user of the camera via hardware, software, or a combination thereof.

20. The program product of claim 18, wherein the camera comprises a first setting that sets the camera to the camera sense mode, a second setting that sets the camera to a video capture mode, a third setting that sets the camera to an off mode in which the camera does not capture data or images, and the video capture mode enables applications separate from the sensing application to access images captured by the camera.

* * * * *